United States Patent
Berg et al.

(10) Patent No.: US 12,078,284 B2
(45) Date of Patent: Sep. 3, 2024

(54) PREFORMED INSULATION FITTING

(71) Applicant: Distribution International, Inc., Houston, TX (US)

(72) Inventors: Steven Berg, Colorado Springs, CO (US); Johnny Toutcheque, Jr., Port Arthur, TX (US)

(73) Assignee: DISTRIBUTION INTERNATIONAL, INC., Houston, TX (US)

( * ) Notice: Subject to any disclaimer, the term of this patent is extended or adjusted under 35 U.S.C. 154(b) by 283 days.

(21) Appl. No.: 17/352,993

(22) Filed: Jun. 21, 2021

(65) Prior Publication Data

US 2021/0396345 A1     Dec. 23, 2021

Related U.S. Application Data

(60) Provisional application No. 63/042,630, filed on Jun. 23, 2020.

(51) Int. Cl.
| | |
|---|---|
| *F16L 59/22* | (2006.01) |
| *B29C 65/00* | (2006.01) |
| *B29C 65/48* | (2006.01) |
| *B29D 23/00* | (2006.01) |

(52) U.S. Cl.
CPC .............. *F16L 59/22* (2013.01); *B29C 65/48* (2013.01); *B29C 66/432* (2013.01); *B29D 23/006* (2013.01)

(58) Field of Classification Search
CPC ....... F16L 59/22; F16L 59/021; F16L 59/022; F16L 59/106; F16L 59/11; F16L 59/14; F16L 58/188; F16L 43/002; F16L 58/1063; B29C 65/48; B29C 66/432; B29D 23/006

USPC .................................................. 285/47, 294.2
See application file for complete search history.

(56) References Cited

U.S. PATENT DOCUMENTS

| | | | | |
|---|---|---|---|---|
| 119,621 | A * | 10/1871 | France | |
| 296,786 | A * | 4/1884 | Rock | |
| 3,379,218 | A * | 4/1968 | Conde | |
| D264,120 | S * | 4/1982 | Karakawa | |
| 4,694,547 | A * | 9/1987 | Broussard | F16L 59/11 |
| | | | | 285/47 |
| 4,838,318 | A * | 6/1989 | Karakawa | F16L 59/11 |
| 7,360,799 | B1 * | 4/2008 | Price | F16L 59/22 |
| | | | | 285/47 |

(Continued)

FOREIGN PATENT DOCUMENTS

KR          2001864 B1 * 7/2019  .............. F16L 59/22

OTHER PUBLICATIONS

KR-2001864-B1—Machine Translation—English (Year: 2019).*

*Primary Examiner* — William S. Choi
(74) *Attorney, Agent, or Firm* — Barnes & Thornburg LLP

(57) ABSTRACT

A method of manufacturing a preformed elbow insulation fitting includes applying an adhesive to an edge surface of each of a plurality of insulation gore components. After applying the adhesive, the plurality of insulation gore components are formed around a mold. When forming the plurality of gores around the mold, adjacent gores of the plurality of gores are adhered together to form a preformed insulation elbow around the mold. The preformed insulation embow can include a split line space between gore components running radially along a perimeter of the preformed insulation elbow. The preformed insulation elbow is then removed from the mold.

17 Claims, 11 Drawing Sheets

(56) References Cited

U.S. PATENT DOCUMENTS

| | | | | |
|---|---|---|---|---|
| 10,634,275 B1* | 4/2020 | Bond | .................... | F16L 59/022 |
| 2020/0363004 A1* | 11/2020 | Flynn | .................... | F16L 59/022 |

* cited by examiner

PREFORMED INSULATION FITTING

RELATED APPLICATION

This application claims priority to U.S. provisional patent application No. 63/042,630, filed Jun. 23, 2020, the entire contents of which is incorporated herein by reference.

TECHNICAL FIELD

This disclosure generally relates to preformed insulation fittings and related methods for manufacturing and installing such preformed insulation fittings. Certain embodiments are described herein in the context of preformed elbow insulating covering and related methods for manufacturing and installing such preformed elbow insulation fittings.

BACKGROUND

Piping, tubing, and other forms of conveyance lines are used in a variety of applications to convey matter, such as liquid, from one location to another. Such applications include, for example, processing facilities in the energy sector. In various applications, it can be important to maintain the matter conveyed via the conveyance line at a particular temperature. The particular temperature at which the matter is to be maintained in the conveyance line can vary depending on the application. For instance, certain types of matter may need to be maintained at a temperature of −250° F., while other types of matter may need to be maintained at a temperature of 1200° F. To maintain the matter being conveyed through the conveyance line at a desired temperature, the conveyance line can include insulation overlaying (e.g., covering) the outer surface of the conveyance line.

Often times, as the conveyance line (e.g., piping) extends from one location to another, the conveyance line changes direction or splits flow into two lines. In the case of a conveyance line change in direction, an elbow can be installed between two lengths of generally linear conveyance line. The elbow can be angled, or bend, between its ends to provide the desired change in conveyance line direction. However, as compared to the linear sections of the conveyance line, it can be time consuming and labor intensive to install insulation overlaying elbows of the conveyance line due to the geometry of the elbows. This, in turn, leads to relatively higher costs associated with insulation at elbows.

SUMMARY

In general, various embodiments relating to preformed insulation fittings and related methods for manufacturing and installing such preformed insulation fittings are disclosed herein. Embodiments disclosed herein include preformed elbow insulation fittings and related methods for manufacturing and installing such preformed elbow insulation fittings.

Currently, elbow insulation material is provided as a flat sheet of material. A user on site in the field then needs to work to form the flat sheet to the shape of the elbow on site and, ultimately, wrap this flat sheet around the elbow. This technique to install insulation over an elbow on site requires significant time on the part of the user on site and can lead to significant insulation material waste as the flat sheet is tailored, in an ad-hoc manner, to the elbow on site. Because the cost of labor in the field is relatively high, this technique leads to high costs associated with insulating conveyance line elbows. Moreover, the ad-hoc nature of this technique can lead to inaccuracies in the insulating covering of the conveyance line elbow, reducing the effectiveness of the insulating covering and, as a result, increasing the costs associated with operating the conveyance line.

Embodiments disclosed herein can useful in increasing the efficiency associated with manufacturing and installing an insulation elbow fitting as well as increasing insulation elbow quality control. Various embodiments disclosed herein can provide a preformed insulation fitting manufacturing in a way that configures the preformed insulation fitting to be simply placed over an elbow, or other portion of a conveyance line, in the field. Such preformed insulation fittings disclosed herein can, thereby, reduce the time and effort needed to install the insulation fitting in the field where labor can be relatively high cost. These preformed insulation fittings can also increase quality control by being manufactured in way that configures the preformed insulation fitting to overlay the geometry of the elbow in the field, thereby reducing instance of uncovered elbow portions.

One exemplary embodiment includes a method of manufacturing a preformed elbow insulation fitting. This method embodiment includes the step of applying an adhesive to an edge surface of each of a plurality of insulation gore components. For example, each of the plurality of insulation gore components can include aerogel material, which forms a bonded, cross-linked macromolecule structure. After applying the adhesive, the method embodiment also includes the step of forming the plurality of insulation gore components around a mold. When forming the plurality of gores around the mold, the method embodiment can further include the step of adhering together adjacent gores of the plurality of gores to form a preformed insulation elbow around the mold. The preformed insulation elbow can include a split line space between gore components running radially along a perimeter of the preformed insulation elbow. In some embodiments, the method can further include applying a second insulating layer over the preformed elbow, such as by applying adhesive to a second plurality of insulation gore components and forming the second plurality of insulation gore components over the preformed elbow and around the mold (e.g., with the seams of the second plurality of adhered insulation gore components offset from the seams of the plurality of adhered insulation gore components over which the second plurality of adhered insulation gore components are formed). Additionally, the method embodiment can include removing the preformed insulation elbow from the mold. In some embodiments, the method can further include a step of temporarily securing gores across the split line. In some embodiments, the method can further include placing the preformed insulation elbow into a packaging container for shipment.

Another embodiment of a method of manufacturing a preformed elbow insulation fitting includes a different application of adhesive. This embodiment can include forming a first insulation gore component around a mold by bringing a first gore component end portion and a second, opposite gore component end portion into contact around the mold. A first adhesive is then applied across the contacting first gore component end portion and second gore component end portion to hold the first insulation gore component encircled around the mold. This is then repeated for other insulation gore components until a desired length of a preformed elbow insulation fitting is formed around the mold. Then, another, second adhesive is applied across the adhered first gore component end portion and second gore component end portion of each insulation gore component encircling the mold. As such, this second adhesive extends parallel to the central longitudinal axis of the preformed elbow insulation fitting across each of the insulation gore components encircling the mold at the contacting first gore component end portion and second gore component end portion of each of the insulation gore components. A binding material is then placed at, and along, the second adhesive to form the preformed elbow insulation fitting. The mold can be removed at any time after each of the insulation gore components are held in place around the mold.

Another embodiment includes a packaged preformed insulation elbow. This packaged preformed insulation elbow embodiment includes a packaging container and a preformed insulation elbow positioned within the packaging container. The preformed insulation elbow includes a plurality of adhered insulation gore components defining a split line space between gore components running radially along a perimeter of the preformed insulation elbow. The plurality of adhered insulation gore components define an opening extending therethrough. The plurality of adhered insulation gore components can include an aerogel material. The preformed insulation elbow includes an inner radius of curvature that differs from an outer radius of curvature.

In one particular embodiment, the preformed insulation elbow includes a second insulation layer formed by a second plurality of adhered insulation gore components. The second plurality of adhered insulation gore components define an opening extending therethrough, where this opening has a larger diameter than the opening defined by the plurality of adhered insulation gore components. The second plurality of adhered insulation gore components also define a second split line space between the second plurality of adhered insulation gore components running radially along a perimeter of the preformed insulation elbow.

An additional embodiment includes a preformed elbow insulation fitting. This preformed insulation elbow fitting includes a plurality of insulation gore components. The plurality of insulation gore components includes a first insulation gore component and a second insulation gore component. Each of the first insulation gore component and the second insulation gore component includes: a first longitudinal side surface, a second longitudinal side surface opposite the first longitudinal side surface, a width defined between the first longitudinal side surface and the second longitudinal side surface, a first gore component end portion, a second gore component end portion opposite the first gore component end portion, and a central region between the first gore component end portion and the second gore component end portion. The width of the first insulation gore component decreases in a direction from the central region of the first insulation gore component toward the first gore component end portion of the first insulation gore component and from the central region of the first insulation gore component toward the second gore component end portion of the first insulation gore component. The width of the second insulation gore component decreases in a direction from the central region of the second insulation gore component toward the first gore component end portion of the second insulation gore component and from the central region of the second insulation gore component toward the second gore component end portion of the second insulation gore component. The first insulation gore component is adhered to the second insulation gore component.

In a further embodiment of the preformed elbow insulation fitting, each of the first insulation gore component and the second insulation gore component includes an aerogel material.

In a further embodiment of the preformed elbow insulation fitting, the central region of the first insulation gore component is adhered to the central region of the second insulation gore component. In a further such embodiment, the first gore component end portion of the first insulation gore component can be adhered to the second gore component end portion of the first insulation gore component, and the first gore component end portion of the second insulation gore component can be adhered to the second gore component end portion of the second insulation gore component. And, the central region of the first insulation gore component can be adhered to the central region of the second insulation gore component via a first adhesive material, and the first gore component end portion of the first insulation gore component can be adhered to the second gore component end portion of the first insulation gore component via a binding material and the first gore component end portion of the second insulation gore component can be adhered to the second gore component end portion of the second insulation gore component via the binding material.

In a further embodiment of the preformed elbow insulation fitting, the preformed elbow insulation fitting further includes a binding material extending along the first gore component end portion of the first insulation gore component, the second gore component end portion of the first insulation gore component, the second longitudinal side surface of the first insulation gore component, the first gore component end portion of the second insulation gore component, the second gore component end portion of the second insulation gore component, and the first longitudinal side surface of the second insulation gore component. In one such embodiment, the binding material can extend parallel to a central longitudinal axis the of preformed elbow insulation fitting.

In a further embodiment of the preformed elbow insulation fitting, the central region of the first insulation gore component and the central region of the second insulation gore component form a back side of the preformed elbow insulation fitting, and the first gore component end portion of the first insulation gore component, the second gore component end portion of the first insulation gore component, the first gore component end portion of the second insulation gore component, and the second gore component end portion of the second insulation gore component form a throat side of the preformed elbow insulation fitting. In one such embodiment, the throat side has a radius of curvature that is less than that of the back side.

In a further embodiment of the preformed elbow insulation fitting, plurality of insulation gore components form a first insulation layer. And, the preformed elbow insulation fitting further includes a second plurality of insulation gore components adhered together to form a second insulation layer over the first insulation layer. In one such embodiment, an interface between each set of adjacent gore components of the plurality of insulation gore components forming the first insulation layer defines a plurality of first split lines at the first insulation layer, an interface between each set of adjacent gore components of the second plurality of insulation gore components forming the second insulation layer defines a plurality of second split lines at the second insulation layer, and each of the plurality of first split lines is offset in a direction parallel to a central longitudinal axis of the preformed elbow insulation fitting from each of the plurality of second split lines. In another such embodiment, the first insulation gore component, of the plurality of insulation gore components forming the first insulation layer, includes an end gore component. This end gore component includes a first longitudinal portion and a second longitudinal portion, and the first longitudinal portion includes a curved longitudinal extension and the second longitudinal portion includes a linear longitudinal extension that extends out from the first longitudinal portion.

In a further embodiment of the preformed elbow insulation fitting, the preformed elbow insulation fitting further includes an opening formed through the plurality of insulation gore components, including through the adhered first insulation gore component and second insulation gore component.

An additional embodiment includes a method. This method embodiment includes the step of forming a first insulation gore component around a mold. The first insulation gore component includes a first insulation gore component first longitudinal side surface, a first insulation gore component second longitudinal side surface opposite the first insulation gore component first longitudinal side surface, a first insulation gore component width defined between the first insulation gore component first longitudinal side surface and the first insulation gore component second longitudinal side surface, a first insulation gore component first end portion, a first insulation gore component second end portion opposite the first insulation gore component first end portion, and a first insulation gore component central region between the first insulation gore component first end portion and the first insulation gore component second end portion. This method also includes the step of forming a second insulation gore component around the mold and adhered to the first insulation gore component. The second insulation gore component includes a second insulation gore component first longitudinal side surface, a second insulation gore component second longitudinal side surface opposite the second insulation gore component first longitudinal side surface, a second insulation gore component width defined between the second insulation gore component first longitudinal side surface and the second insulation gore component second longitudinal side surface, a second insulation gore component first end portion, a second insulation gore component second end portion opposite the second insulation gore component first end portion, and a second insulation gore component central region between the second insulation gore component first end portion and the second insulation gore component second end portion. This method further includes the steps of applying a first adhesive to adhere the first insulation gore component to the second insulation gore component, and applying a second adhesive at an exposed surface of the first insulation gore component and an exposed surface of the second insulation gore component. And, this method additional includes the step of placing a binding material at the second adhesive such that the binding material extends along the first insulation gore component first end portion, the first insulation gore component second end portion, the first insulation gore component second longitudinal side surface, the second insulation gore component first end portion, the second insulation gore component second end portion, and the second insulation gore component first longitudinal side surface.

In a further embodiment of the method, the mold includes a mold back side and a mold throat side. The mold throat side has a radius of curvature that is less than that of the mold back side. In some examples, the binding material can be placed so as to extend along the mold throat side.

In a further embodiment of the method, the first insulation gore component and the second insulation gore component each include an aerogel material.

In a further embodiment of the method, the central region of the first insulation gore component is adhered to the central region of the second insulation gore component. For example, the central region of the first insulation gore component can be adhered to the central region of the second insulation gore component prior to applying the first adhesive, the second adhesive, and the binding material. And, the first adhesive can be applied to adhere the first insulation gore component first end portion to the first insulation gore component second end portion and to adhere the second insulation gore component first end portion to the first insulation gore component second end portion.

In a further embodiment of the method, the method additionally includes the step of, after forming the first insulation gore component, forming the second insulation gore component, applying the first adhesive, applying the second adhesive, and applying the binding material, removing the mold to form an opening through the adhered first insulation gore component and second insulation gore component.

The details of one or more examples are set forth in the accompanying drawings and the description below. Other features, objects, and advantages will be apparent from the description and drawings.

BRIEF DESCRIPTION OF THE DRAWINGS

The following drawings are illustrative of particular embodiments of the present invention and, therefore, do not limit the scope of the invention. The drawings are intended for use in conjunction with the explanations in the following description. Embodiments of the invention will hereinafter be described in conjunction with the appended drawings, wherein like numerals denote like elements. The features illustrated in the drawings are not necessarily to scale, though embodiments within the scope of the present invention can include one or more of the illustrated features (e.g., each of the illustrated features) at the scale shown.

FIG. 2 is a plan view of an embodiment of a plurality of insulation gore components. FIG. 3 is a perspective view of an initial set of a plurality of adjacent insulation gore components being formed around a mold and adhered to one another. FIG. 4 is a perspective view of a further set of a plurality of adjacent insulation gore components formed around the mold and adhered to one another together forming an upper half of a preformed elbow insulation fitting. FIG. 5 is a perspective view of the plurality of insulation gore components adhered together and forming the preformed elbow insulation fitting around the mold. FIG. 6 is a perspective view of the preformed elbow insulation fitting removed from the mold and including optional temporary securement of the insulation gore components across a split line.

DETAILED DESCRIPTION

The following detailed description is exemplary in nature and is not intended to limit the scope, applicability, or configuration of the invention in any way. Rather, the following description provides some practical illustrations for implementing embodiments of the present invention. Examples of constructions, materials, and/or dimensions are provided for selected elements. Those skilled in the art will recognize that many of the noted examples have a variety of suitable alternatives.

Figure 1:
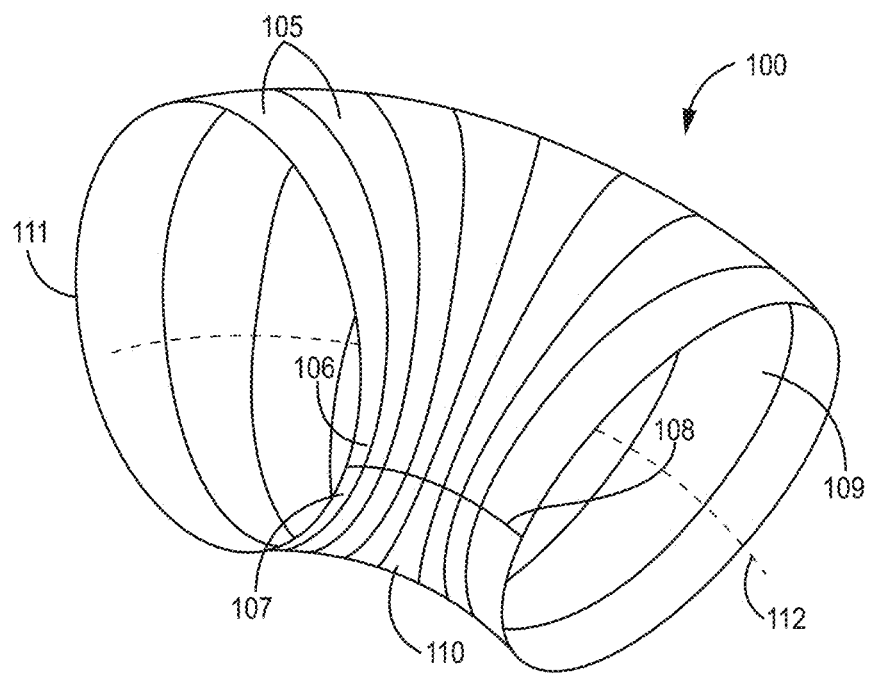
FIG. 1 is a perspective view of an embodiment of a preformed elbow insulation fitting.

FIG. 1 shows a perspective view of an exemplary embodiment of a preformed elbow insulation fitting 100. The preformed elbow insulation fitting 100 includes a plurality of insulation gore components 105 adhered together. For example, interfacing side surfaces of the insulation gore components 105 can include an adhesive material for adhering the insulation gore components 105 together in a side-by-side arrangement. Each of the insulation gore components 105 extends from a first gore component end portion 106 to a second gore component end portion 107 that is opposite the first gore component end portion 106. The first gore component end portion 106 and the second gore component end portion 107 each form a free end of the respective insulation gore component 105.

The preformed elbow insulation fitting 100 defines an opening 109 extending therethrough. The opening 109 is formed to extend through the preformed elbow insulation fitting 100 by each successive insulation gore component 105. In particular, each insulation gore component 105 extends in a curved geometry from the first gore component end portion 106 to the second gore component end portion 107, thereby defining the opening 109 through that particular insulation gore component 105.

The preformed elbow insulation fitting 100 includes a split line space 108 that is defined between the first gore component end portion 106 and the second gore component end portion 107 of each respective insulation gore component 105. As shown here, the split line space 108 forms a space, or gap, between the first gore component end portion 106 and the second gore component end portion 107 of each respective insulation gore component 105. The split line space 108 runs radially (e.g., in a direction generally parallel to the central longitudinal axis 112) along a perimeter of the preformed elbow insulation fitting 100. The preformed elbow insulation fitting 100 can generally be resilient, and the split line space 108 can be configured to allow the preformed elbow insulation fitting 100 to be flexed so as to expand the split line space 108 and allow the preformed elbow insulation fitting 100 to be placed around a conveyance line elbow.

The preformed insulation elbow fitting 100 can include a throat side 110 and a back side 111 that is opposite the throat side 110. The length, measured in a direction parallel to a central longitudinal axis 112 of the preformed insulation elbow fitting 100, of the throat side 110 and the back side 111 can differ. For example, the length of the back side 111 can be greater than the length of the throat side 110. In addition, an inner radius of curvature of the preformed insulation elbow fitting 100 defined along the throat side 110 can differ from an outer radius of curvature of the preformed insulation elbow fitting 100 defined along the back side 111. For example, the inner radius of curvature defined along the throat side 110 can be less than the outer radius of curvature defined along the back side 111 (e.g., and the length of the back side 111 can be greater than the length of the throat side 110). Such a configuration of the preformed insulation elbow fitting 100 can allow the preformed insulation elbow fitting 100 to match the configuration of a conveyance line elbow so that the preformed insulation elbow fitting 100 can be fit appropriately over the conveyance line elbow to provide effective insulating capability. As shown here, the split line space 108 runs along the throat side 110, but in other embodiments the split line space 108 can run along other sides of the preformed insulation elbow fitting 100, including along the back side 111.

The preformed insulation elbow fitting 100 can include an aerogel material. For example, each of the plurality of adhered insulation gore components 105 can include an aerogel material. The aerogel material can form a bonded, cross-linked macromolecule structure at the insulation gore components 105. Depending on the application in which the preformed insulation elbow fitting 100 is to be used, the aerogel material can be a relatively hot application type aerogel material or a relatively cool type aerogel material.

FIGS. 2-6 illustrate an embodiment of a sequence of forming the preformed elbow insulation fitting 100.

Figure 2:
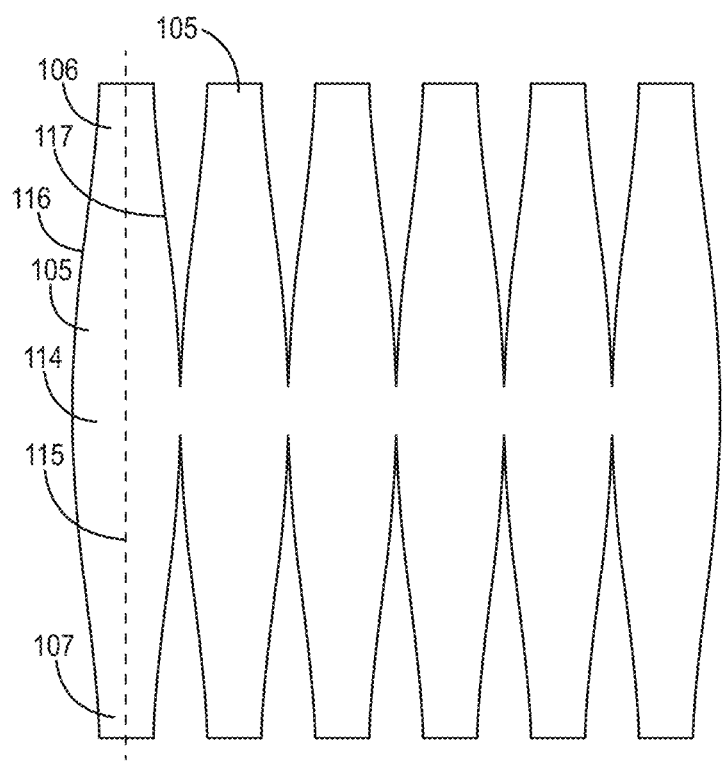
FIGS. 2-6 illustrate an embodiment of a sequence of forming a preformed elbow insulation fitting.

FIG. 2 is a plan view of an embodiment of the plurality of insulation gore components 105, prior to being formed into the preformed elbow insulation fitting 100. Each of the insulation gore components 105 can have a central region 114, a central longitudinal axis 115, and a width defined between a first longitudinal side surface 116 and a second longitudinal side surface 117. As shown here, the width of each of the plurality of insulation gore components 105 can vary along the central longitudinal axis 115. In particular, the width of each of the plurality of insulation gore components 105 can be greatest at the central region 114. And, the width of each of the plurality of insulation gore components 105 can decrease (e.g., continually decrease) moving away from the central region 114 in each direction toward the first gore component end portion 106 and the second gore component end portion 107. Thus, the first longitudinal side surface 116 and a second longitudinal side surface 117 an converge toward one another along the central longitudinal axis 115 moving away from the central region 114. This can result, in some examples, in the first gore component end portion 106 and the second gore component end portion 107 being the smallest width region of the insulation gore component 105. In many embodiments, the central region 114 can form the back side 111 of the preformed insulation elbow fitting 100 while the first and second gore component end portions 106, 107 can form the throat side 110. Thus, in such embodiments, the greatest width region of the insulation gore component 105—the central region 114—can form the back side 111, and the smallest width region of the insulation gore component 105—the first and second gore component end portions 106, 107—can form the throat side 110.

Prior to being formed into the preformed elbow insulation fitting 100, the plurality of insulation gore components 105 can be adhered together at the central region 114, as shown in FIG. 2. The second longitudinal side surface 117, at the central region 114, of one insulation gore component 105 can be adhered to the first longitudinal side surface 116, at the central region 114, of an adjacent insulation gore component 105. Thus, in various embodiments, the plurality of insulation gore components 105 can be adhered together via interfacing longitudinal side surfaces 117, 116 at the greatest width region, the central region 114, of the respective insulation gore components 105.

Also prior to being formed into the preformed elbow insulation fitting 100, an adhesive can be applied to the first longitudinal side surface 116 and/or the second longitudinal side surface 117 of each insulation gore components 105. In one example, each longitudinal side surface, or edge surface, of an insulation gore component 105 that is interfacing with another insulation gore component 105 can have an adhesive applied thereto. The adhesive can be applied along the length of the respective interfacing longitudinal side surfaces of adjacent insulation gore components 105 except at the central region 114 (which can already be adhered to an adjacent insulation gore component 105). Thus, the non-central region portions (e.g., the first and second gore component end portions 106, 107) of the first longitudinal side surface 116 and/or the second longitudinal side surface 117 of the insulation gore component 105 can include the adhesive. As such, in some embodiments, this adhesive can be applied at portions of the insulation gore component 105 where the width of the insulation gore component 105 decreases. This adhesive can be configured to adhere adjacent insulation gore components 105 together when the insulation gore components 105 are formed into the preformed elbow insulation fitting 100.

Figure 3:
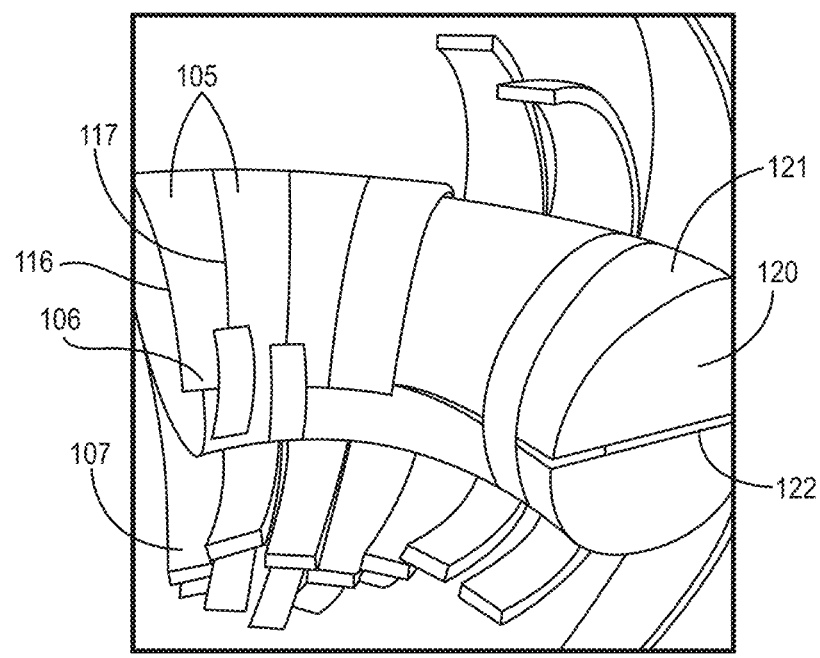

FIG. 3 is a perspective view of an initial set of a plurality of adjacent insulation gore components 105 being formed around a mold 120 and adhered to one another. The plurality of adjacent insulation gore components 105 can be positioned relative to the mold such that the central region 114 of each of the insulation gore components 105 will interface with the back side of the mold 120 (e.g., the central region 114 will be opposite the throat side of the mold 120). The mold 120 can resemble a conveyance line elbow over which the preformed elbow insulation fitting 100 is to be installed when formed. Namely, the mold 120 can include a back side 121 and a throat side 122, with the length of the back side 121 being greater than the length of the throat side 122. In addition, an inner radius of curvature defined along the throat side 122 of the mold 120 can be less than an outer radius of curvature defined along the back side 121 of the mold 120.

Each of the insulation gore components 105 can be formed around the mold 120. As shown in FIG. 3, the first gore component end portion 106 of an initial insulation gore component 105 can be rolled over the mold 120. In some examples, a temporary adhesive can be used to hold the first gore component end portion 106 in place at the mold 120 once it has been rolled over the mold 120. Then, the first gore component end portion 106 of a second, adjacent insulation gore component 105 can be rolled over the mold 120. As this second, adjacent insulation gore component 105 is being rolled over the mold 120, the adhesive applied to its first longitudinal side surface 116 can be configured to adhere to the second longitudinal side surface 117 of the adjacent insulation gore component 105 already rolled over the mold 120. Thus, as a result of having applied the adhesive to one or both longitudinal side surfaces 116, 117 of each insulation gore components 105 prior to forming the preformed elbow insulation fitting, forming the insulation gore components 105 around the mold 120 can cause adjacent insulation gore components 105 to adhere together as they are rolled over the mold 120. In particular, in embodiments where the plurality of insulation gore components 105 are adhered together at the central region 114 prior to forming the insulation gore components 105 around the mold 120, forming the insulation gore components 105 around the mold 120 can cause non-central region portions (e.g., portions where the width of the insulation gore component 105 decreases, such as near the first and second gore component end portions 106, 107 and portion between the first and second gore component end portions 106, 107 and the central region 114) of adjacent insulation gore components 105 to adhere together as they are rolled over the mold 120.

Figure 4:
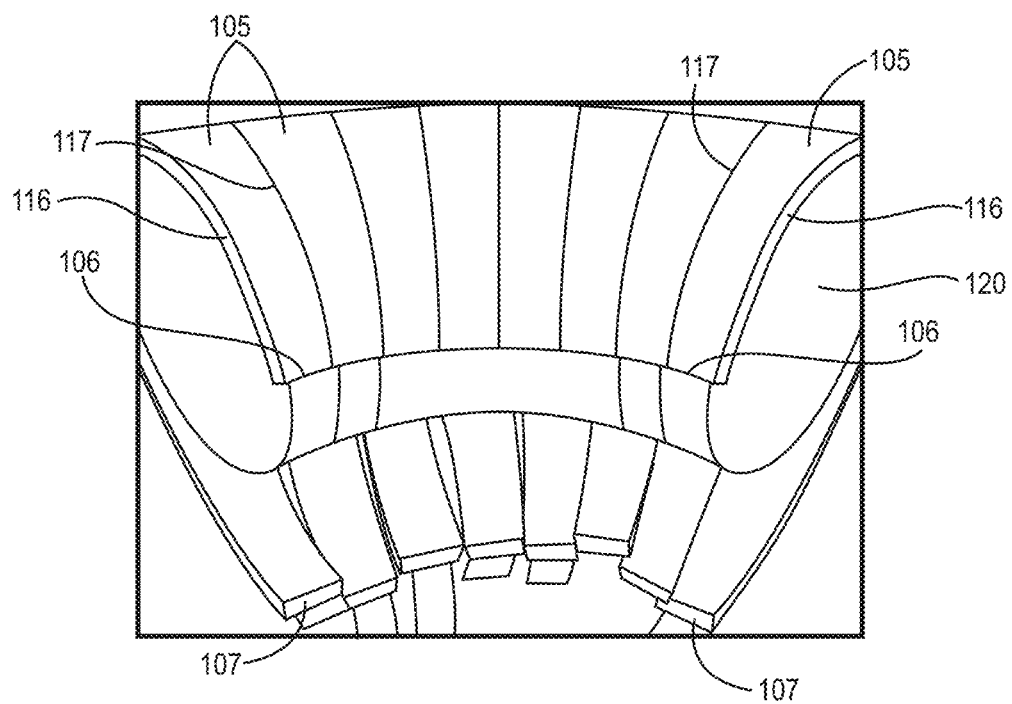

This process can be repeated such that the first gore component end portion 106 of each successive insulation gore component 105 can be formed around the mold 120 and, thereby, each insulation gore component 105 can been adhered to an adjacent insulation gore component at an area at and near the first gore component end portion 106. FIG. 4 illustrates an example where this process has been repeated such that the first gore component end portion 106 of each successive insulation gore component 105 has been formed around the mold 120 and, thereby, adhered to the adjacent insulation gore component 105.

Figure 5:
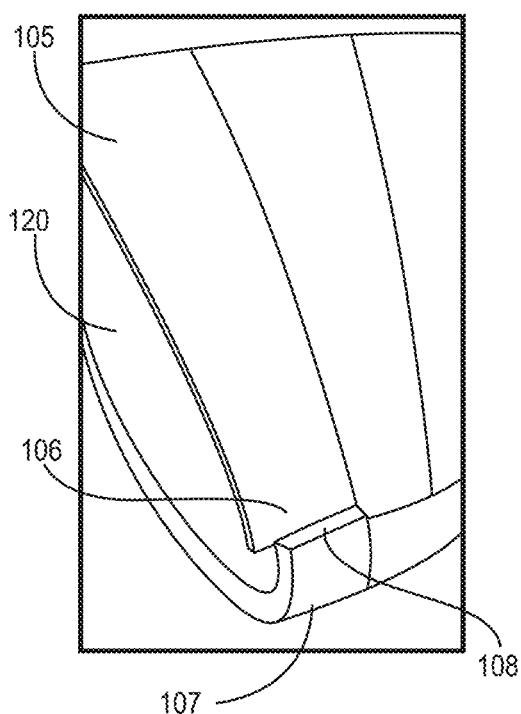

The same process can then be applied such that the second gore component end portion 107 of an initial insulation gore component 105 can be rolled over the mold 120. Then, the second gore component end portion 107 of a second, adjacent insulation gore component 105 can be rolled over the mold 120. As this second, adjacent insulation gore component 105 is being rolled over the mold 120, the adhesive applied to its first longitudinal side surface 116 can be configured to adhere to the second longitudinal side surface 117 of the adjacent insulation gore component already rolled over the mold 120 at an area at and near the second gore component end portion 107. This can be repeated such that the second gore component end portion 107 of each successive insulation gore component 105 can be formed around the mold 120 and, thereby, each insulation gore component 105 can been adhered to an adjacent insulation gore component at an area at and near the second gore component end portion 107. FIG. 5 illustrates an example where this process has been repeated such that the second gore component end portion 107 of each successive insulation gore component 105 has been formed around the mold 120 and, thereby, adhered to the adjacent insulation gore component 105.

While adhesive can be applied at the first longitudinal side surface 116 and/or the second longitudinal side surface 117 of the insulation gore components 105, the first gore component end portion 106 and the second gore component end portion 107, in some embodiments, can be free of adhesive thereat such that the split line space 108, such as shown in FIG. 5, is formed between the first gore component end portion 106 and the second gore component end portion 107 of each insulation gore component 105. Thus, in some embodiments, the first gore component end portion 106 and the second gore component end portion 107 of one or more (e.g., each) insulation gore components 105 may not contact one another and instead can be spaced apart via the spline line space 108.

Figure 6:
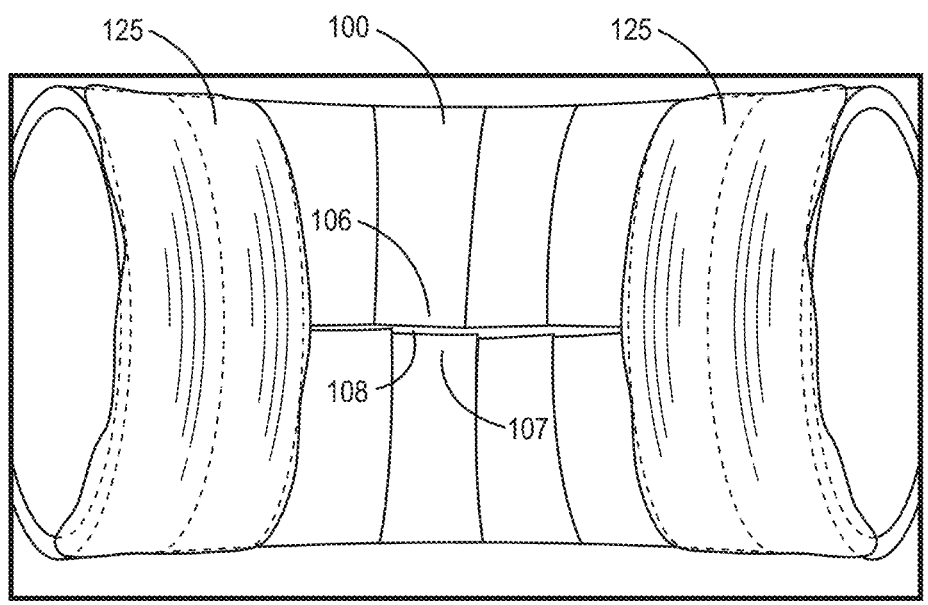

Once each of the insulation gore components 105 has been formed around the mold 120, the mold 120 can be removed, leaving the preformed elbow insulation fitting 100. FIG. 6 illustrates the preformed elbow insulation fitting 100 after the mold has been removed. As shown in this example, the split line space 108 is defined between the first gore component end portion 106 and the second gore component end portion 107 of the preformed elbow insulation fitting 100. In the illustrated example, a temporary securement element 125 can be placed at the preformed elbow 100 removed from the mold to assist the preformed elbow insulation fitting 100 in retaining its shape. In the illustrated example, one temporary securement element 125 is placed near one longitudinal end portion of the preformed elbow insulation fitting 100 and a second temporary securement element 125 is placed near the opposite longitudinal end portion of the performed elbow insulation fitting 100. The temporary securement element 125 used in the example of FIG. 6 is a fitted wrap material, such as shrink wrap material.

Figure 7:
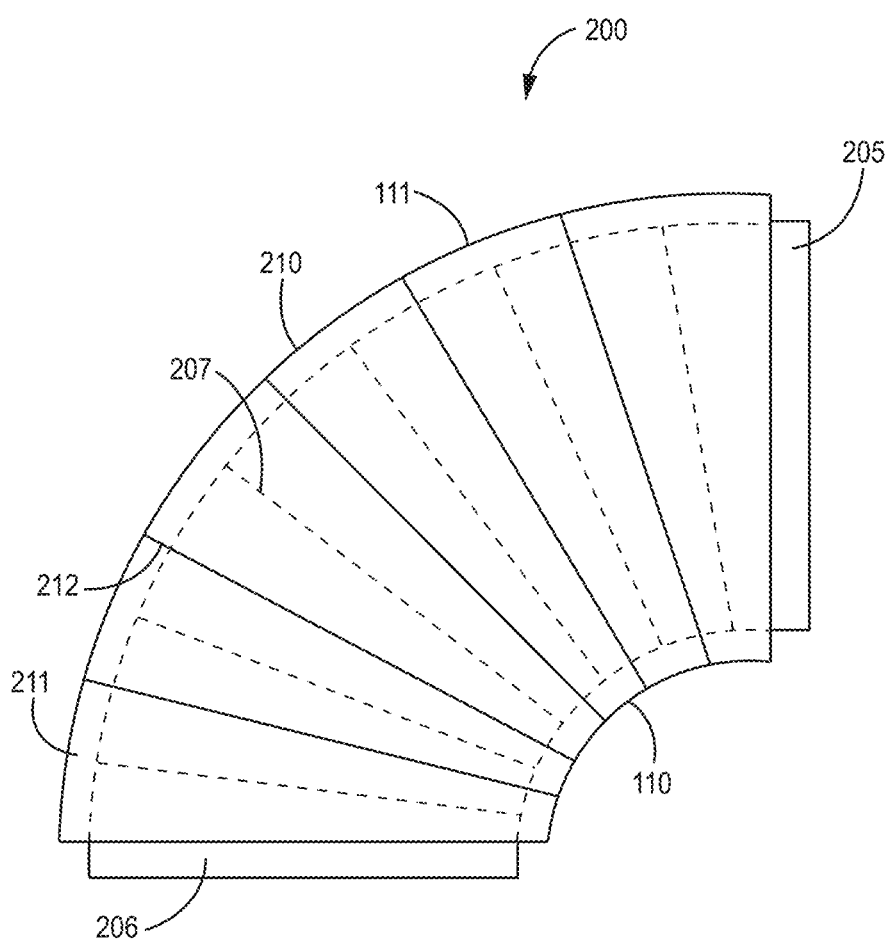
FIG. 7 is a top plan view of an embodiment of a preformed elbow insulation fitting including first and second insulation layers each formed by a plurality of adhered insulation gore components.

FIG. 7 is a top plan view of an embodiment of a preformed elbow insulation fitting 200 including a first insulation layer 205 and a second insulation layer 210. The first insulation layer 205 is formed by a plurality of adhered insulation gore components 206, and the second insulation layer 210 is formed by a plurality of adhered insulation gore components 211. The first insulation layer 205 can be formed in a manner similar to, or the same as, that disclosed with respect to the preformed elbow insulation fitting 100. And, the second insulation layer 210 can then be formed over the first insulation layer 205 in a similar manner whereby each of the plurality of gores 211 are formed around the first insulation layer 205 and, thereby, adhered to adjacent gores 211 in the process.

As shown in FIG. 7, the first insulation layer 205 and the second insulation layer 210 of the preformed elbow insulation fitting 200 are arranged with staggered gore joints. The first insulation layer 205 includes gore joints 207 (shown with dashed lines) where each insulation gore component 206, of the first insulation layer 205, is adhered to an adjacent insulation gore component 206. And, the second insulation layer 210 includes gore joints 212 (shown with solid lines) where each insulation gore component 211, of the second insulation layer 210, is adhered to an adjacent insulation gore component 211. The gore joints 207 of the first insulation layer 205 are spaced (e.g., in a longitudinal direction that is parallel to the central longitudinal axis of the preformed elbow insulation fitting 200) from the location of the gore joints 212 of the second insulation layer 210. In this way, the gore joints 207 and the gore joints 212 are staggered and do not overlap with one another. This staggered gore joint configuration can be useful, for instance, in mitigating the transmission of fluid through the preformed elbow insulation fitting 200. Though, in other embodiments, the preformed elbow insulation fitting 200 can include gore joints of different insulation that are aligned with one another.

In some embodiments, to assist in creating staggered gore joints, one of the insulation layers can extend at one or both ends thereof from the interfacing insulation layer. As shown in the embodiment of FIG. 7, the first insulation layer 205 extends out from the second insulation layer 210 at each end of the preformed elbow insulation fitting 200. Where the gore components 206 of the first insulation layer 205 and the gore components 211 of the second insulation layer 210 are of a same, or similar, width, this extension of the first insulation layer 205 can result in offsetting the gore joints 207, 212 of the first and second insulation layers 205, 210 so as to create the staggered gore joints of the preformed elbow insulation fitting 200. Another embodiment within the scope of the present disclosure can be the same as that described with respect to the preformed elbow insulating fitting 200 above, except that the second insulation layer 210 extends out at the ends beyond the first insulation layer 205.

Figure 8:
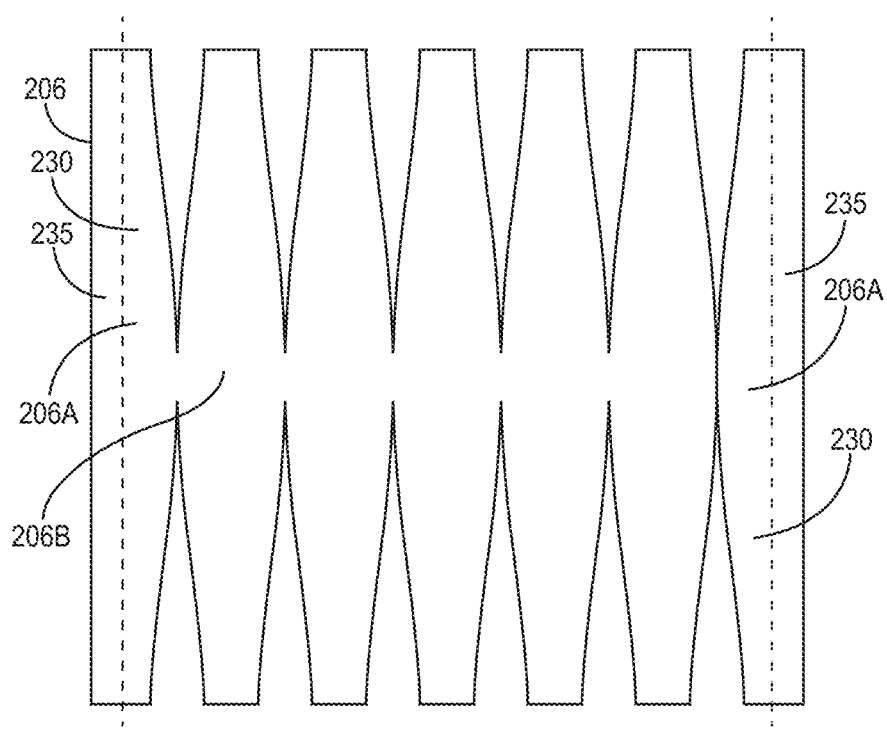
FIG. 8 is a perspective view of an embodiment of a plurality of insulation gore components that can be adhered together to form a second insulation layer of a preformed elbow insulation fitting. The illustrated embodiment of the plurality of insulation gore components can be configured to allow the seams of this plurality of insulation gore components to be offset from the seams of another plurality of insulation gore components when the plurality of insulation gore components are overlaid to form the preformed elbow insulation fitting.

FIG. 8 is a perspective view of an embodiment of a plurality of the insulation gore components 206 that can be adhered together to form an insulation layer with staggered gore joints relative to another insulation layer of the preformed elbow insulation fitting. For example, where the preformed elbow insulation fitting 200 is to include two insulation layers 205, 210, the insulation layer 205 that is to extend out can be formed from the plurality of the insulation gore components 206 shown in FIG. 8 while the other insulation layer 210 can be formed of the plurality of insulation gore components 211 such as those shown in FIG. 2.

The plurality of the insulation gore components 206 shown in FIG. 8 facilitates the presence of the extension (e.g., as shown in FIG. 7) by including an end gore 206*a* at each end of the adhered plurality of the insulation gore components 206. The end gore 206*a* includes a first longitudinal portion 230 and a second longitudinal portion 235. The first longitudinal portion 230 can be a curved longitudinal extension, such as illustrated in the example of FIG. 8. More specifically, in the illustrated example, the first longitudinal portion 230 can be one half of that of corresponding portions of the other intermediate gores 206*b* (e.g., one half of that of corresponding portions of the other intermediate gores 206*b* as defined by the central longitudinal axis; an intermediate gore 206*b* is split in half and placed on each end gore 206*a*). The second longitudinal portion 235 can be a generally linear longitudinal extension out from the first longitudinal portion 230. This second longitudinal portion 235 can create an appropriate extension of the plurality of the insulation gore components 206 so as to shift the pattern of the plurality of the insulation gore components 206 relative to the pattern of the plurality of gore components shown in FIG. 2 (and, e.g., used for the other insulation layer along with the plurality of the insulation gore components 206). For example, the second longitudinal portion 235 can form an extension out from the first longitudinal portion 230 in the range of one to five inches, such as two to three inches. The offset created by the geometry of the two end gores 206*a* differing from that of the intermediate gores 206*b* by and the plurality of gore components shown in FIG. 2 can result in providing the staggered gore joints discussed in reference to FIG. 7.

The embodiment described in reference to FIGS. 7 and 8 is referred to as having two insulation layers. Though other preformed elbow insulation fitting embodiments within the scope of the present disclosure can include more than two insulation layers.

Figure 9:
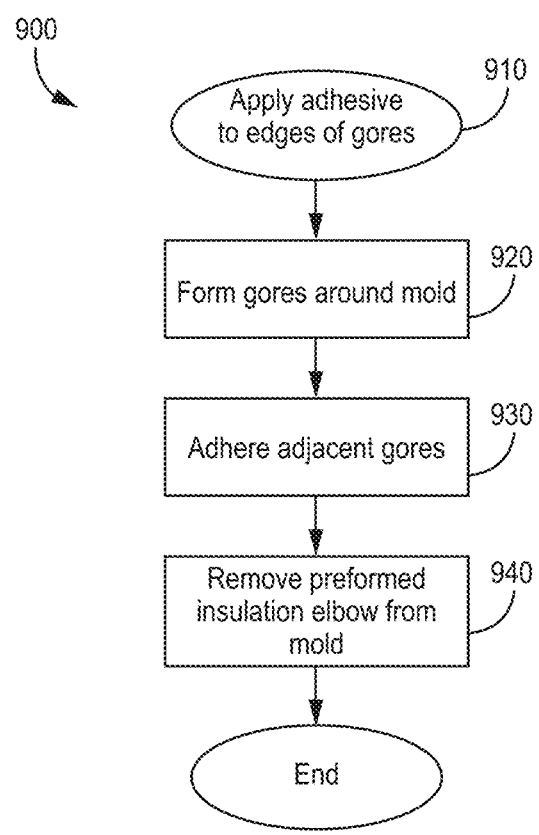
FIG. 9 is a flow diagram of an embodiment of a method of manufacturing a preformed elbow insulation fitting.

FIG. 9 is a flow diagram of an embodiment of a method 900 of manufacturing a preformed elbow insulation fitting. The preformed elbow insulation fitting manufactured by the method 900 can be, for example, similar to, or the same as, the preformed elbow insulation fitting 100 or the preformed elbow insulation fitting 200 disclosed elsewhere herein.

At step 910, the method 900 includes applying adhesive to one or more edges of a plurality of insulation gore components. For example, adhesive can be applied to one or both of a first and second longitudinal side surface of each insulation gore component. As noted previously, the plurality of insulation gore components can include an aerogel material. And, in some embodiments, the plurality of insulation gore components can be adhered together at respective central regions thereof, while a respective longitudinal side surface of an insulation gore component at or near first and second gore component end portions can be spaced apart from a respective longitudinal side surface of another, adjacent insulation gore component at or near first and second gore component end portions that another, adjacent insulation gore component.

At step 920, the method 900 includes forming the plurality of gore insulation components around a mold. The mold can include a throat side and a back side as described elsewhere herein. The plurality of gore insulation components can be placed relative to the mold such that the central region of each gore insulation component interfaces (e.g., contacts) the back side of the mold and, thus, the central region of each gore insulation component is opposite the throat side of the mold. In examples where a second insulation layer is to be included at the preformed elbow insulation fitting, a second plurality of gore insulation components can be formed over the plurality of gore insulation components formed around the mold.

At step 930, as the plurality of gore insulation components are formed around the mold at step 920, adjacent gore insulation components can be adhered together via the adhesive applied at step 910. In examples where a second insulation layer is to be included at the preformed elbow insulation fitting, adjacent gores of the second plurality of gore insulation components can be adhered together via adhesive applied at step 910.

At step 940, after adhering adjacent gore insulation components together around the mold at step 930, the mold preformed elbow insulation fitting can be formed and removed from the mold. In one example, one or more temporary securement elements can be placed onto the preformed elbow insulation fitting, before or after it is removed from the mold, to assist in retaining the form of the preformed elbow insulation fitting.

In a further embodiment, the method 900 can include an additional step of packaging the preformed elbow insulation fitting, for instance after the mold has been removed. At this step, the preformed elbow insulation fitting can be placed in a packaging container. In some cases, protective packaging material can be included in the packaging container, such as around or inside of the opening of the preformed elbow insulation fitting, to reduce risk of damage to the preformed elbow insulation fitting during shipping.

Figure 10:
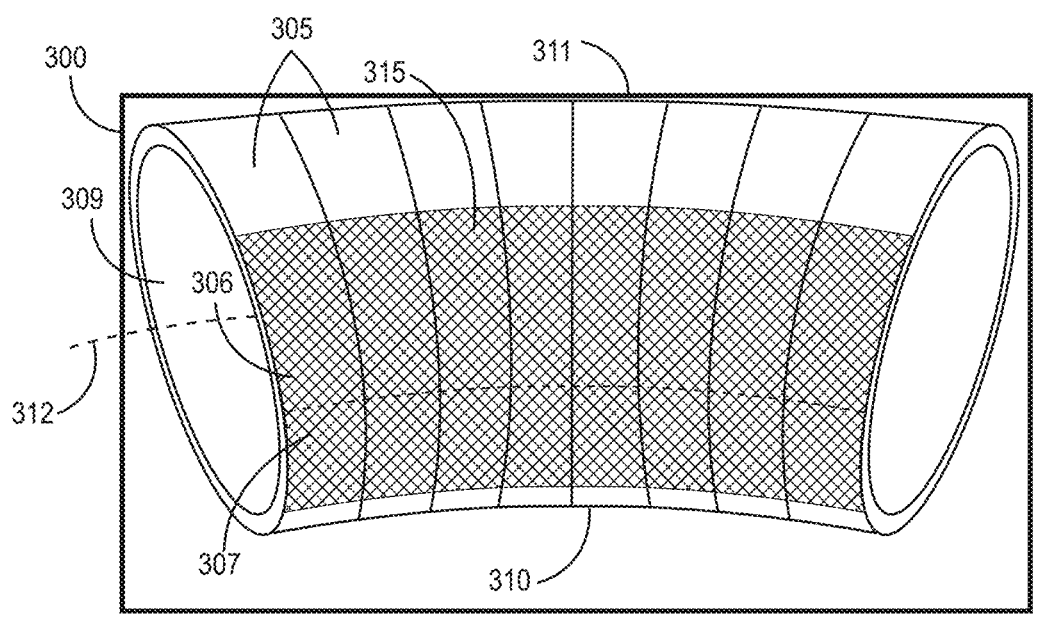
FIG. 10 is a perspective view of another embodiment of a preformed elbow insulation fitting.

FIG. 10 illustrates a perspective view of another embodiment of a preformed elbow insulation fitting 300. The preformed elbow insulation fitting 300 includes a plurality of insulation gore components 305 adhered together. For example, interfacing gore components 305 can include an adhesive material at one or both of the interfacing, longitudinal side surfaces and/or end portions 306, 307 thereof for adhering the insulation gore components 305 together at the gore component (e.g., at a central region and near end portions 306, 307) in a side-by-side arrangement. Each of the insulation gore components 305 extends from a first gore component end portion 306 to a second gore component end portion 307 that is opposite the first gore component end portion 306. The first gore component end portion 306 and the second gore component end portion 307 each form a free end of the respective insulation gore component 305.

The preformed elbow insulation fitting 300 includes a binding material 315. The binding material 315 can be any type of suitable material for helping to hold together the first and second gore component end portions 306, 307 of each insulation gore component 305. The binding material 315 can also be a type of material suitable for selective perforation (e.g., by tearing, use of scissors, etc.) when the preformed elbow insulation fitting 300 is to be installed over a conveyance line elbow or other type of conveyance line component. For example, the binding 315 illustrated here is in the form of a suitable mesh material.

The binding material 315 can be placed along the interfacing and longitudinal side and/or end portion adhered gore component end portions 306, 307 of each insulation gore component 305. As such, the binding material 315 can extend parallel to the central longitudinal axis 312 of the preformed elbow insulation fitting 300 across each of the insulation gore components 305 (e.g., over each of the first gore component end portion 306 and the second gore component end portion 307 of each of the insulation gore components 305). For example, once the adhesive is applied at the interfacing longitudinal side surfaces near gore component end portions 306, 307 and/or at gore component end portions 306, 307 to adhere these interfacing gore component longitudinal side surfaces and/or end portions 306, 207 together, the binding material 315 can be placed along these adhered gore component end portions 306, 307. As shown in FIG. 10, the binding material 315 can be placed over each of the first gore component end portion 306, the second gore component end portion 307, and at least one longitudinal side surface of each of the insulation gore components 305 making up the preformed elbow insulation fitting 300. To assist in holding the binding material 315 in place along the interfacing and adhered gore component end portions 306, 307 of each insulation gore component 305, a second adhesive can be applied across the interfacing and adhered gore component end portions 306, 307 of each insulation gore component 305, and the binding material 315 can be placed onto this applied second adhesive.

The preformed elbow insulation fitting 300 defines an opening 309 therethrough. The opening 309 is formed to extend through the preformed elbow insulation fitting 300 by each successive insulation gore component 305. In particular, each insulation gore component 305 extends in a curved geometry from the first gore component end portion 306 to the second gore component end portion 307, thereby defining the opening 309 through that particular insulation gore component 305.

The preformed insulation elbow fitting 300 can include a throat side 310 and a back side 311 that is opposite the throat side 310. The length, measured in a direction parallel to a central longitudinal axis 312 of the preformed insulation elbow fitting 300, of the throat side 310 and the back side 311 can differ. For example, the length of the back side 311 can be greater than the length of the throat side 310. In addition, an inner radius of curvature of the preformed insulation elbow fitting 300 defined along the throat side 310 can differ from an outer radius of curvature of the preformed insulation elbow fitting 300 defined along the back side 311. For example, the inner radius of curvature defined along the throat side 310 can be less than the outer radius of curvature defined along the back side 311. Such a configuration of the preformed insulation elbow fitting 300 can allow the preformed insulation elbow fitting 300 to match the configuration of a conveyance line elbow so that the preformed insulation elbow fitting 300 can be fit appropriately over the conveyance line elbow to provide effective insulating capability. In the illustrated embodiment, the gore component end portions 306, 307 interface, and are adhered together, for instance at least in part via the binding material 315, and the binding material 315 extends along the throat side 110. Though in other embodiments the gore component end portions 306, 307 can interface, and be adhered together, along another side of the preformed elbow insulation fitting 300, such as along the back side 111.

The preformed insulation elbow fitting 300 can include an aerogel material. For example, each of the plurality of adhered insulation gore components 305 can include an aerogel material. The aerogel material can form a bonded, cross-linked macromolecule structure at the insulation gore components 305. Depending on the application in which the preformed insulation elbow fitting 300 is to be used, the aerogel material can be a relatively hot application type aerogel material or a relatively cool type aerogel material.

Figure 11:
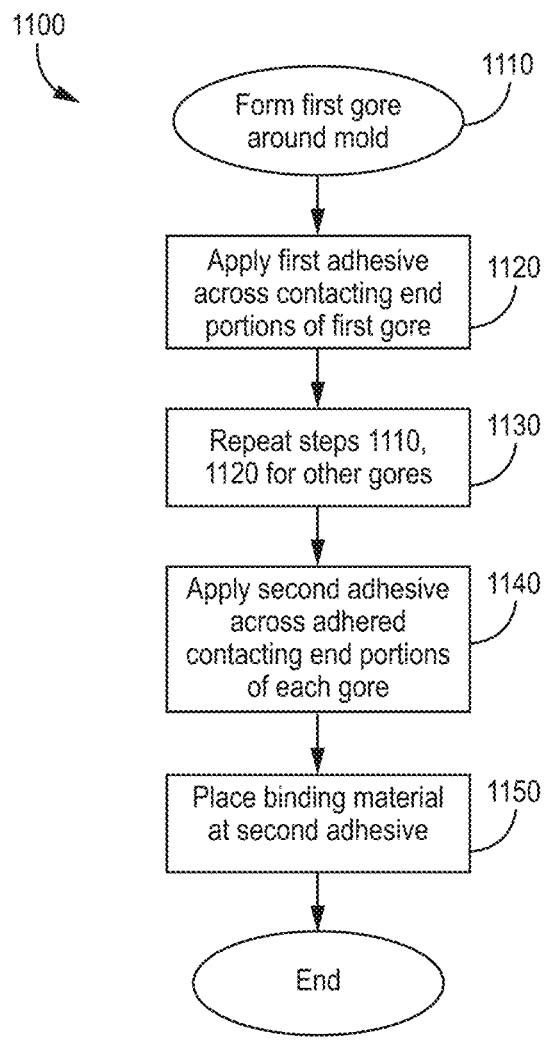
FIG. 11 is a flow diagram of another embodiment of a method of manufacturing a preformed elbow insulation fitting.

FIG. 11 is a flow diagram of another embodiment of a method 1100 of manufacturing a preformed elbow insulation fitting. The preformed elbow insulation fitting manufactured by the method 1100 can be, for example, similar to, or the same as, the preformed elbow insulation fitting 300 disclosed elsewhere herein. The method 1100, as compared to the method 900, can, in some examples, include adhesive application at a different location.

At step 1110, the method 1100 includes forming a first insulation gore component around a mold. The first insulation gore component can be formed around the mold by bringing a first gore component end portion and a second, opposite gore component end portion into contact with one another around the mold. In this way, the first gore component end portion and the second gore component end portion can encircle at least a portion of the perimeter of the mold and contact one another at a side of the mold.

At step 1120, the method 1100 includes applying a first adhesive across the contacting first gore component end portion and second gore component end portion to hold the first insulation gore component encircled around the mold. Applying the first adhesive across the contacting first gore component end portion and second gore component end portion of the first insulation gore component can adhere together the first gore component end portion and second gore component end portion. The first adhesive can be applied at one, or both, of the first gore component end portion and second gore component end portion and then the first gore component end portion and second gore component end portion can be brought together into contact, resulting in the adhesive holding the first gore component end portion and second gore component end portion together. In some examples, the first adhesive can also be applied at interfacing longitudinal side surfaces of respective insulation gore components.

At step 1130, the method 1100 includes repeating steps 1110 and 1120 for other insulation gore components that are to form the preformed elbow insulation fitting. For example, a second insulation gore component can be formed around the mold, adjacent to the first insulation gore component, by bringing a first gore component end portion and a second, opposite gore component end portion of the second insulation gore component into contact with one another around the mold. The first adhesive can then be applied across the contacting first gore component end portion and second gore component end portion, of the second insulation gore component, to hold the second insulation gore component encircled around the mold. Likewise, other insulation gore components can be formed around the mold accordingly to create a number of adjacent insulation gore components extending along the central longitudinal axis of the preformed elbow insulation fitting.

At step 1140, the method 1100 includes applying a second adhesive across the adhered first gore component end portion and second gore component end portion of each insulation gore component encircling the mold. The second adhesive can be applied so as to extend parallel to the central longitudinal axis of the preformed elbow insulation fitting across each of the insulation gore components encircling the mold at the contacting first gore component end portion and second gore component end portion.

At step 1150, the method 1100 includes placing a binding material at, and along, the second adhesive to form the preformed elbow insulation fitting. The binding material can be a type of material suitable for selective perforation (e.g., by tearing, use of scissors, etc.) when the preformed elbow insulation fitting is to be installed over a conveyance line elbow or other type of conveyance line component.

In the method 1100, the mold can be removed at any time after each of the insulation gore components are held in place around the mold at step 1130.

In one embodiment, the method 1100 can further include steps of packaging the preformed elbow insulation fitting and installing the preformed elbow insulation fitting at a conveyance line elbow or other type of conveyance line component. For example, installing the preformed elbow insulation fitting can include removing the preformed elbow insulation fitting from a packaging container and then perforating, or removing, the binding material (e.g., by cutting the bind material) along the interface between the first and second gore component end portions of each insulation gore component. This can then allow the preformed elbow insulation fitting to be placed around the conveyance line elbow or other type of conveyance line component.

Various non-limiting exemplary embodiments have been described. It will be appreciated that suitable alternatives are possible without departing from the scope of the examples described herein.

What is claimed is:

1. A preformed elbow insulation fitting comprising:
   a plurality of insulation gore components, the plurality of insulation gore components including a first insulation gore component and a second insulation gore component, each of the first insulation gore component and the second insulation gore component comprising:
   a first longitudinal side surface,
   a second longitudinal side surface opposite the first longitudinal side surface,
   a width defined between the first longitudinal side surface and the second longitudinal side surface,
   a first gore component end portion,
   a second gore component end portion opposite the first gore component end portion, and
   a central region between the first gore component end portion and the second gore component end portion,
   wherein the width of the first insulation gore component decreases in a direction from the central region of the first insulation gore component toward the first gore component end portion of the first insulation gore component and from the central region of the first insulation gore component toward the second gore component end portion of the first insulation gore component,
   wherein the width of the second insulation gore component decreases in a direction from the central region of the second insulation gore component toward the first gore component end portion of the second insulation gore component and from the central region of the second insulation gore component toward the second gore component end portion of the second insulation gore component, and herein the first insulation gore component is adhered to the second insulation gore component, wherein the central region of the first insulation gore component is adhered to the central region of the second insulation gore component, wherein the first gore component end portion of the first insulation gore component is adhered to the second gore component end portion of the first insulation gore component, and wherein the first gore component end portion of the second insulation gore component is adhered to the second gore component end portion of the second insulation gore component, and, wherein the central region of the first insulation gore component is adhered to the central region of the second insulation gore component via a first adhesive material, and wherein the first gore component end portion of the first insulation gore component is adhered to the second gore component end portion of the first insulation gore component via a binding material and the first gore component end portion of the second insulation gore component is adhered to the second gore component end portion of the second insulation gore component via the binding material.

2. The preformed elbow insulation fitting of claim 1, wherein each of the first insulation gore component and the second insulation gore component includes an aerogel material.

3. The preformed elbow insulation fitting of claim 1, wherein
the binding material extends along the first gore component end portion of the first insulation gore component, the second gore component end portion of the first insulation gore component, the second longitudinal side surface of the first insulation gore component, the first gore component end portion of the second insulation gore component, the second gore component end portion of the second insulation gore component, and the first longitudinal side surface of the second insulation gore component.

4. The preformed elbow insulation fitting of claim 3, wherein the binding material extends parallel to a central longitudinal axis of the preformed elbow insulation fitting.

5. The preformed elbow insulation fitting of claim 1, wherein the central region of the first insulation gore component and the central region of the second insulation gore component form a back side of the preformed elbow insulation fitting, and wherein the first gore component end portion of the first insulation gore component, the second gore component end portion of the first insulation gore component, the first gore component end portion of the second insulation gore component, and the second gore component end portion of the second insulation gore component form a throat side of the preformed elbow insulation fitting.

6. The preformed elbow insulation fitting of claim 5, wherein the throat side has a radius of curvature that is less than that of the back side.

7. The preformed elbow insulation fitting of claim 1, wherein the plurality of insulation gore components form a first insulation layer, and further comprising:
a second plurality of insulation gore components adhered together to form a second insulation layer over the first insulation layer.

8. The preformed elbow insulation fitting of claim 7, wherein an interface between each set of adjacent gore components of the plurality of insulation gore components forming the first insulation layer defines a plurality of first split lines at the first insulation layer, wherein an interface between each set of adjacent gore components of the second plurality of insulation gore components forming the second insulation layer defines a plurality of second split lines at the second insulation layer, and wherein each of the plurality of first split lines is offset in a direction parallel to a central longitudinal axis of the preformed elbow insulation fitting from each of the plurality of second split lines.

9. The preformed elbow insulation fitting of claim 7, wherein the first insulation gore component, of the plurality of insulation gore components forming the first insulation layer, comprises an end gore component, wherein the end gore component comprises a first longitudinal portion and a second longitudinal portion, and wherein the first longitudinal portion comprises a curved longitudinal extension and the second longitudinal portion comprises a linear longitudinal extension that extends out from the first longitudinal portion.

10. The preformed elbow insulation fitting of claim 1, further comprising:
an opening formed through the plurality of insulation gore components, including through the adhered first insulation gore component and second insulation gore component.

11. A method comprising the steps of:
forming a first insulation gore component around a mold, the first insulation gore component including a first insulation gore component first longitudinal side surface, a first insulation gore component second longitudinal side surface opposite the first insulation gore component first longitudinal side surface, a first insulation gore component width defined between the first insulation gore component first longitudinal side surface and the first insulation gore component second longitudinal side surface, a first insulation gore component first end portion, a first insulation gore component second end portion opposite the first insulation gore component first end portion, and a first insulation gore component central region between the first insulation gore component first end portion and the first insulation gore component second end portion;

forming a second insulation gore component around the mold and adhered to the first insulation gore component, the second insulation gore component including a second insulation gore component first longitudinal side surface, a second insulation gore component second longitudinal side surface opposite the second insulation gore component first longitudinal side surface, a second insulation gore component width defined between the second insulation gore component first longitudinal side surface and the second insulation gore component second longitudinal side surface, a second insulation gore component first end portion, a second insulation gore component second end portion opposite the second insulation gore component first end portion, and a second insulation gore component central region between the second insulation gore component first end portion and the second insulation gore component second end portion;

applying a first adhesive to adhere the first insulation gore component to the second insulation gore component;

applying a second adhesive at an exposed surface of the first insulation gore component and an exposed surface of the second insulation gore component; and placing a binding material at the second adhesive such that the binding material extends along the first insulation gore component first end portion, the first insulation gore component second end portion, the first insulation gore component second longitudinal side surface, the second insulation gore component first end portion, the second insulation gore component second end portion, and the second insulation gore component first longitudinal side surface.

12. The method of claim 11, wherein the mold includes a mold back side and a mold throat side, and wherein the mold throat side has a radius of curvature that is less than that of the mold back side.

13. The method of claim 12, wherein the binding material is placed so as to extend along the mold throat side.

14. The method of claim 11, wherein the first insulation gore component and the second insulation gore component each include an aerogel material.

15. The method of claim 11, wherein the central region of the first insulation gore component is adhered to the central region of the second insulation gore component.

16. The method of claim 15, wherein the central region of the first insulation gore component is adhered to the central region of the second insulation gore component prior to applying the first adhesive, the second adhesive, and the binding material, and wherein the first adhesive is applied to adhere the first insulation gore component first end portion to the first insulation gore component second end portion and to adhere the second insulation gore component first end portion to the first insulation gore component second end portion.

17. The method of claim 11, further comprising:
after forming the first insulation gore component, forming the second insulation gore component, applying the first adhesive, applying the second adhesive, and applying the binding material, removing the mold to form an opening through the adhered first insulation gore component and second insulation gore component.

* * * * *